United States Patent
Cheung et al.

(10) Patent No.: US 8,891,751 B2
(45) Date of Patent: Nov. 18, 2014

(54) METHOD AND APPARATUS FOR PROVIDING CALL PARKING

(75) Inventors: Eric Cheung, New York, NY (US); Kermit Hal Purdy, Bernardsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 959 days.

(21) Appl. No.: 12/248,221

(22) Filed: Oct. 9, 2008

(65) Prior Publication Data
US 2010/0091970 A1   Apr. 15, 2010

(51) Int. Cl.
H04M 7/00    (2006.01)
H04M 3/42    (2006.01)
H04M 3/428   (2006.01)
H04M 3/533   (2006.01)

(52) U.S. Cl.
CPC ........ H04M 3/4285 (2013.01); H04M 3/42374 (2013.01); H04M 3/53366 (2013.01)
USPC .................................... 379/207.07

(58) Field of Classification Search
USPC ........ 379/207.07, 207.02, 201.01; 455/435.1, 455/411.1
See application file for complete search history.

(56) References Cited

U.S. PATENT DOCUMENTS

| | | | |
|---|---|---|---|
| 2003/0059023 A1* | 3/2003 | Crockett et al. | 379/220.01 |
| 2004/0235509 A1* | 11/2004 | Burritt et al. | 455/519 |
| 2005/0048981 A1* | 3/2005 | Anupam et al. | 455/445 |
| 2006/0126806 A1* | 6/2006 | Trandal et al. | 379/88.26 |
| 2006/0203988 A1* | 9/2006 | Rodriguez et al. | 379/265.01 |
| 2006/0256949 A1* | 11/2006 | Noble, Jr. | 379/265.01 |
| 2008/0014938 A1* | 1/2008 | Hart et al. | 455/435.1 |

* cited by examiner

*Primary Examiner* — Sonia Gay

(57) ABSTRACT

A method and apparatus for providing call parking for a communication network are disclosed. The method first determines a disconnection of a first party's endpoint device, wherein said first party is either a calling party or a called party. The method then determines if said disconnection of said first party's endpoint device is due to hanging up. If said disconnection is not due to hanging up, the method parks a second party wherein said second party is either a calling party or a called party communicating with said first party prior to said disconnection. The method determines if said first party's device is back online and reconnects said first party and second party if said first party's device is back online.

8 Claims, 4 Drawing Sheets

200

METHOD AND APPARATUS FOR PROVIDING CALL PARKING

The present invention relates generally to communication networks and, more particularly, to a method and apparatus for providing call parking for a communication network.

BACKGROUND OF THE INVENTION

Various communication networks may become unreliable for various reasons. For example, one or more parties of a telephone call on a wireless network may lose a signal and be disconnected. For example, one party may drive through a tunnel and lose the signal. It is not always obvious to either party that the call has been disconnected. Thus, one party may continue to carry on with the conversation while the disconnected party is trying to call back. In addition, if the call is established through a call center, calling back may result in talking to a different agent of the call center, thereby increasing the frustration of the caller.

SUMMARY OF THE INVENTION

In one embodiment, the present invention discloses a method and apparatus for providing a call parking feature in a network. For example, the method detects a disconnection of a first party from a call between the first party and a second party. The method determines if the disconnection is due to a hanging up event and parks the second party if the disconnection is not due to the hanging up event.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing call parking in a network, e.g., a wireless network, a packet network, an Internet Protocol (IP) network, a switched network, and the like. Although the present invention is discussed below in the context of wireless and IP networks, the present invention is not so limited. Namely, the present invention can be applied to any network that is not reliable all the time.

Figure 1:
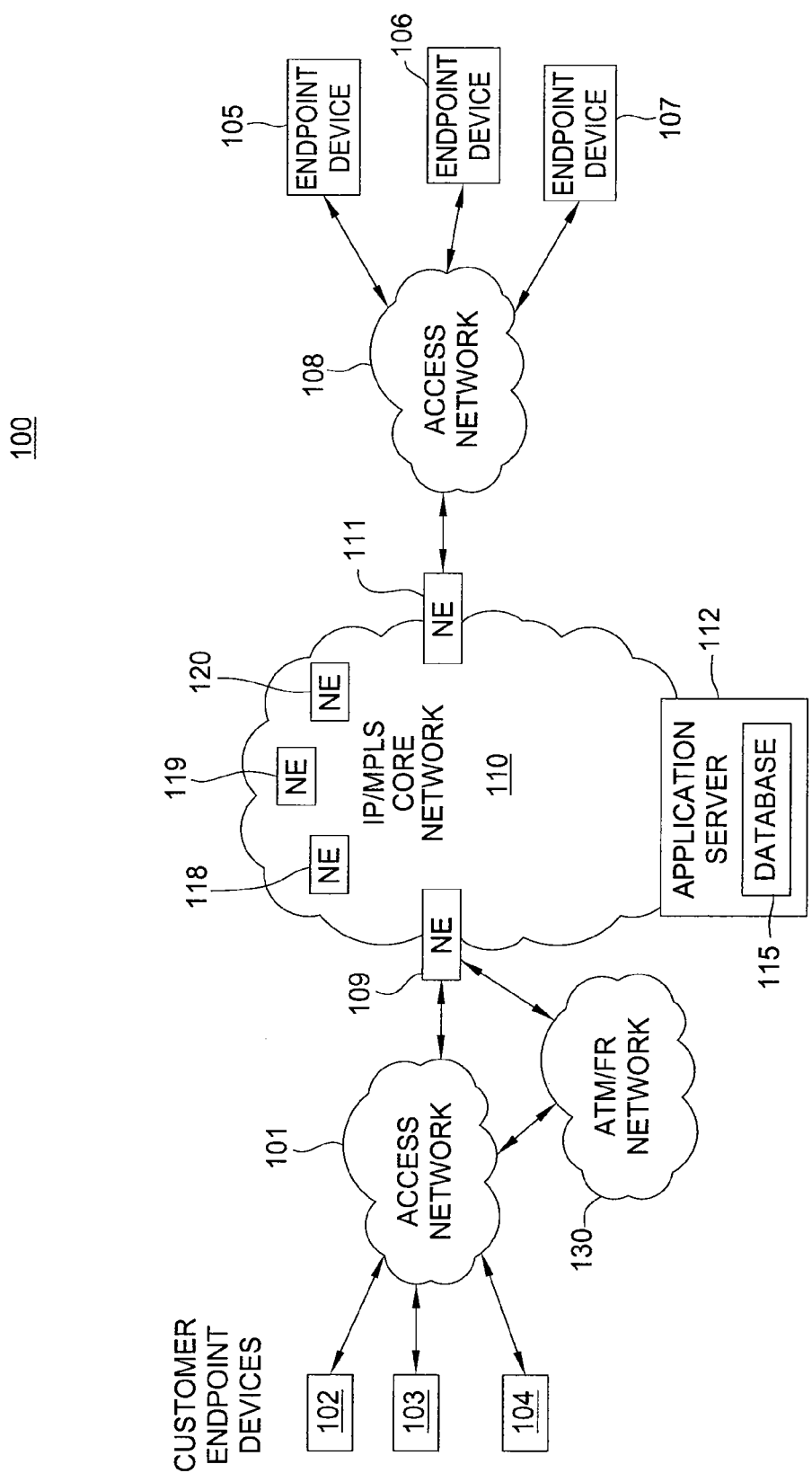
FIG. 1 is a block diagram depicting an exemplary network related to the current invention.

FIG. 1 is a block diagram depicting an exemplary network 100 related to the current invention. Exemplary networks include switched networks, Internet protocol (IP) networks, Asynchronous Transfer Mode (ATM) networks, frame-relay networks, wireless networks, and the like.

A switched network is broadly defined as a network that creates continuous pathways between callers and called parties by disconnecting and reconnecting lines in various configurations (i.e. by switching). ATM, frame-relay and IP networks, etc. are packet based networks. An IP network is broadly defined as a network that uses Internet Protocol such as IPv4 or IPv6 and the like to exchange data packets. Wireless networks are networks used to enable users to communicate using wireless devices, e.g., Global System for Mobile (GSM) networks, wide area cellular telephone networks like 2G and 3G (second and third generation cellular networks), and the like.

In one embodiment, the network 100 may comprise a plurality of endpoint devices 102-104 configured for communication with the core packet network 110 (e.g., an IP based core backbone network supported by a service provider). The endpoint devices 102-104 may communicate with the IP/MPLS core network 110 via an access network 101. Similarly, a plurality of endpoint devices 105-107 are configured for communication with the core packet network 110 via an access network 108. The network elements 109 and 111 may serve as gateway servers or edge routers for the IP/MPLS core network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and one or more of the NEs 109 and 111. The access networks 101 and 108 may each comprise a Digital Subscriber Line (DSL) network, a broadband cable access network, a Local Area Network (LAN), a Wireless Access Network (WAN), a $3^{rd}$ party network, and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection to the IP/MPLS core network 110 is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 contains Layer 2 switches functioning as Provider Edge Routers (PER) and/or Provider Routers (PR). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the IP/MPLS core infrastructure and interface with customer endpoints over various types of access networks. An NE that resides at the edge of a core infrastructure is typically implemented as an edge router, a media gateway, a border element, a firewall, a switch, and the like. An NE may also reside within the IP network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, one application server are depicted in FIG. 1, the communication system 100 may be expanded by including additional endpoint devices, access networks, network elements, application servers, $3^{rd}$ party networks, etc. without altering the scope of the present invention.

The above IP network is described to provide an illustrative environment in which packets for voice and data services are transmitted on networks. The current invention discloses a method and apparatus for providing call parking in networks, when a party in a call is disconnected without hanging up.

Figure 2:
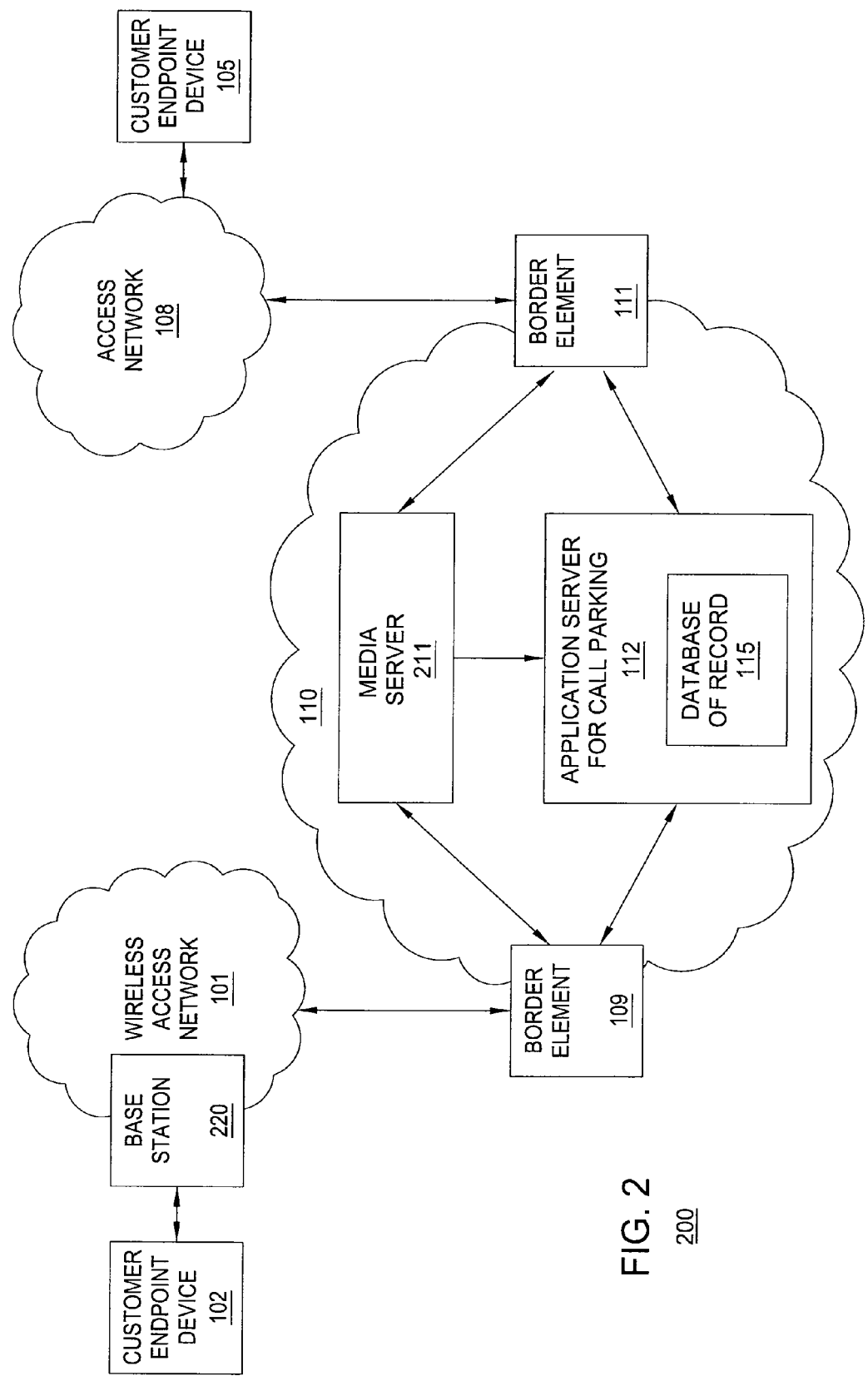
FIG. 2 illustrates an exemplary network with call parking.

FIG. 2 illustrates an exemplary network 200 with a call parking feature. For example, a customer may use a wireless customer endpoint device 102 for sending and receiving packets. The wireless endpoint device 102 is connected to a base station 220 (described below) located on a wireless access network 101. The access network 101 is connected to an IP/MPLS core network 110 through a gateway router or a border element 109. Another customer is using an endpoint device 105 for sending and receiving packets. The endpoint device 105 is connected to the IP/MPLS core network 110 through an access network 108 and a border element 111. In one embodiment, the IP/MPLS core network 110 contains the BEs 109 and 111, an application server for call parking 112, and a media server 211. The application server for call parking 112 contains a database of record 115.

Base Station (BS) refers to a transceiver station that is deployed to handle all incoming and outgoing calls from multiple subscriber devices built with a radio frequency transmitter and receiver pair. For example, wireless phones, routers, switches, computers, etc. may access communications services via a base station using a radio frequency.

In operation, traffic originated by the user endpoint device 102 and destined towards user endpoint device 105 traverses the IP/MPLS core network 110 from BE 109 to BE 111. Traffic originated by the user endpoint device 105 and destined towards user endpoint device 102 traverses the IP/MPLS core network 110 from BE 111 to BE 109. That means, packets sent by user endpoint device 102 to user endpoint device 105 traverse towards the access network 108 via the wireless access network 101 and IP/MPLS core network 110. Similarly, packets sent by user endpoint device 105 to the wireless endpoint device 102 traverse towards the wireless access network 101 via the access network 108 and the IP/MPLS core network 110.

In one embodiment, the current invention provides a method and apparatus for providing a call parking feature service when either the calling party or called party is disconnected without hanging up. For example, the method first determines when a call is disconnected without a party hanging up. The method then parks the other party (e.g., the party that is not disconnected from the call) such that the conversation may resume when the disconnected party comes back online. For example, the application server may monitor the disconnected party's device to detect when it comes back online. A signal may then be sent to the device when it comes back online notifying the user that there is a parked call. The user may then pickup the parked call to resume the conversation.

In one embodiment, the method may provide an option to the party that is not disconnected (e.g., the network connected party) to either have his/her call parked or be provided with contact information (e.g., a phone number) of the disconnected party. For example, the party that is not disconnected may not have time to simply wait for the disconnected party's device to come back online. However, the party may nevertheless wish to continue the conversation. For example, if the calling party had talked to an agent at a call center but the call is inadvertently disconnected, the agent may not be able to wait indefinitely until the caller comes back online. The agent may elect to be provided with a call back number (e.g., via a caller ID service) of the calling party instead of being parked. This will allow the agent to proactively initiate a call to the calling party, thereby ensuring customer satisfaction since the calling party may have waited a considerable time before speaking to the agent in the previous interrupted call.

Figure 3:
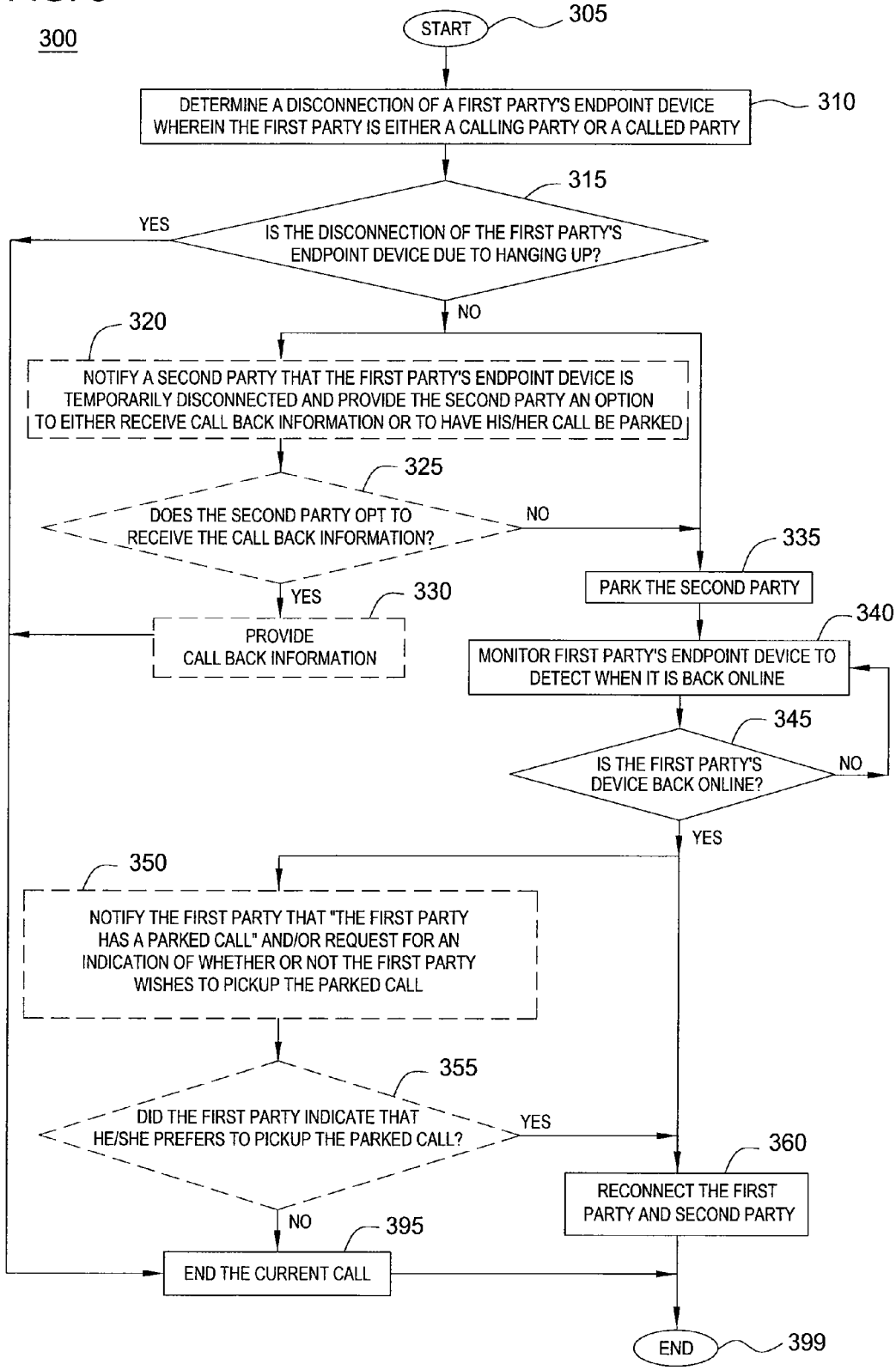
FIG. 3 illustrates a flowchart of a method for call parking.

FIG. 3 illustrates a flowchart of a method 300 for providing a call parking feature. For example, one or more steps of method 300 can be implemented by application server 112. Method 300 starts in step 305 and proceeds to step 310.

In step 310, method 300 determines or detects a disconnection of a first party's endpoint device from an ongoing call, wherein the first party is either a calling party or a called party. For example, the method determines or detects that communication with a user endpoint device that was previously engaged in an active conversation has been interrupted. In one example, the calling party is disconnected from the call. In another example, the called party is disconnected from the call. It should be noted that the call may be disconnected either intentionally by the user (e.g., by hanging up) or unintentionally due to an interruption, e.g., due to a loss of signal (e.g., going through a tunnel, entering an elevator, temporary hardware/software failure in the end point devices or network components, and the like). The method then proceeds to step 315.

In step 315, method 300 determines whether or not the disconnection of the first party's endpoint device is due to an intentional event, e.g., a hang up event initiated by one of the parties to the call. If the disconnection is due to the user hanging up the phone, the method proceeds to step 395 to end the current call. Otherwise, the method proceeds to either optional step 320 or step 335. The method proceeds to optional step 320 if the second party is given an option to either be parked or to receive call back information. If the second party is being parked without being provided an option, the method proceeds to step 335. It should be noted that the network connected party (e.g., the second party) may be presented with a pre-recorded message (e.g., via the media server) indicating that the call was unintentionally interrupted and not terminated intentionally by the disconnected party. For example, upon detection of an unintentional disconnection, the media server may play the message, "Your call has been interrupted and will now be placed in park pending reconnection," and the like. It should be noted that any number of pre-recorded messages can be played.

In one alternate embodiment, a service provider of an IMS (IP Multimedia Subsystem) may implement a Call Control Element (CCE) 212 (broadly interpreted as containing a Call Session Control Function (CSCF)) may learn or detect that the mobile device has lost radio connection with the network, and then sends a BYE message with an appropriate header to indicate the condition. This BYE message can then be used by the application server 112 to determine the cause of the disconnection.

In optional step 320, method 300 notifies a second party that the first party's endpoint device is unintentionally disconnected (e.g., failure to receive a proper "bye" message from the first party's endpoint device). Furthermore, method 300 provides the second party with an option to either receive call back information pertaining to the first party or to have the present call be parked. For example, the method may play a message to the second party via the media server stating that the other party to this call has been unintentionally disconnected. The method may also instruct the second party to indicate whether or not to have the call parked by pressing a specific key on the telephone keypad or via a voice command. The method then proceeds to step 325.

In step 325, method 300 determines if the second party opts to receive the call back information or to have the call parked. If the second party opts to receive call back information, the method proceeds to step 330. Otherwise, the method proceeds to step 335. For example, if the second party opts to have the call parked, the method proceeds to step 335.

In step 330, method 300 provides the second party with the call back information. For example, the method may offer a call back telephone number as an alternative to being parked, if the second party chooses not to wait. For example, the first party may have an alternative phone number, e.g., a phone number that is not routed through a call-center, a wire based telephone number, and so on. The call back information may have been provided directly by the caller, e.g., the caller may need to provide various information before the caller is connected to an agent. Alternatively, the call back information may have been obtained indirectly from the caller, e.g., via a caller ID feature. The method then proceeds to step 395 to end the current call. Alternatively, the second party may provide call back information so that the first party may use the provided information to call the second party.

In step 335, method 300 parks the second party. For example, if the caller is unintentionally disconnected, the method parks the called party, i.e., a session or a call leg to the second party is maintained and placed in hold. The method then proceeds to step 340.

In step 340, method 300 monitors whether the first party's endpoint device is back online. For example, an application server within the network may detect that the first party's endpoint device has initiated a call request to establish a call to the second party, e.g., identifying the first party's device via caller ID, source IP address, and the like. Alternatively, the method may actively initiate a call to the disconnected party's phone number to bring the disconnected party's device back online. The method then proceeds to step 345.

In step 345, method 300 determines whether or not the first party's device is back online. If the first party's device is not back online, the method proceeds back to step 340 to continue monitoring. If the first party's device is back online, the method proceeds to either optional step 350 or to step 360. The method proceeds to optional step 350 if the method enables the first party to decide whether or not to pickup a parked call. In one embodiment, if the method automatically reconnects the first and second parties when the first party comes back online (i.e. no decision is needed from first party), the method proceeds to step 360.

In optional step 350, method 300 notifies the first party that there is a parked call for the first party and/or requests for an indication of whether or not the first party wishes to pickup the parked call. For example, the method may notify the first party that the second party has been parked after the disconnection of the previous call and is currently waiting. The method may then request the first party to either resume conversation with the second party or to terminate the call. The method then proceeds to step 355.

In step 355, method 300 determines if the first party indicated that he/she prefers to pickup the parked call. For example, the first party may indicate that he/she wishes to resume the conversation by pressing a specific key or via a voice command. If the first party indicated that he/she prefers to pickup the parked call, the method proceeds to step 360. Otherwise, the method proceeds to step 395 to end the current call.

In step 360, method 300 reconnects the first party and the second party. For example, the method enables or establishes a connection between the caller and called party (e.g., the party that has been parked) such that they may resume their conversation. The method then ends in step 399.

In step 395, method 300 ends the current call. For example, if the first party's device comes back online and the first party chooses not to resume the previous conversation with the second party, the method ends the call. In other words, the second party that has been parked can be ended. It should be noted that a message can be played to the second party indicating that the first party does not wish to continue the previously disconnected call before disconnecting the second party from the network. Furthermore, having indicated that it does not want to be reconnected to the second party, the first party's device will be allowed to access other services, e.g., initiating a call to a third party and so on. Method 300 ends in step 399.

In one alternate embodiment, the method may cause the disconnected party's device to be brought back online by calling back the disconnected party in a predetermined time interval, e.g., initiating a call every 15 seconds, 30 seconds, etc. In one embodiment, the service provider has the ability to selectively configure the predetermined time interval. For example, one service provider may choose to call the disconnected party every minute, whereas another service provider may choose to call the disconnected party every 15 seconds, and so on.

In one alternate embodiment, the customer with a call parking feature may proactively trigger the call parking feature, e.g., by sending a signal to the application server to park the call. For example, if the caller is about to enter an area where the conversation may have to be suspended, the caller may send a control signal (e.g., a voice command, or a signal via a keypad) to park the call. For example, the caller may be passing through an area that is known to cause interruptions to calls, e.g., a tunnel. In this scenario, the caller may wish to resume his/her conversation after exiting the tunnel without having to redial the phone number of the called party. For example, upon receiving the signal to activate the call park feature, the application server will inform the called party that the caller has actively initiated the call parking feature and that the called party will now be temporarily parked until the caller is back online. For example, the disconnection can be intentionally initiated by the service provider, where a call session to the first party and a call session to the second party are placed in hold or parked. In one embodiment, if one of the call sessions is then subsequently lost, the application server will initiate a call, e.g., to the caller's endpoint device at a predetermined time interval. As such, a caller exiting the tunnel will receive a call back from the service provider's network, and the call between the caller and called party may resume.

In one alternate embodiment, the service provider enables a customer to access a parked call by accessing a call parking service. For example, the calling party may have subscribed to a call parking service wherein customers to the call parking service are provided with an access number (e.g., a call parking service access number) to get reconnected to a parked call in the event that they are disconnected. For example, the customer may call an access number for the service, provide information that may be used to authenticate the customer's identity, and then access the customer's parked calls. Thus, the customer may access the parked call either using the same endpoint device and phone number or from a separate number. For example, a customer may be disconnected while using a cellular phone but may wish to access the parked call using a landline phone.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
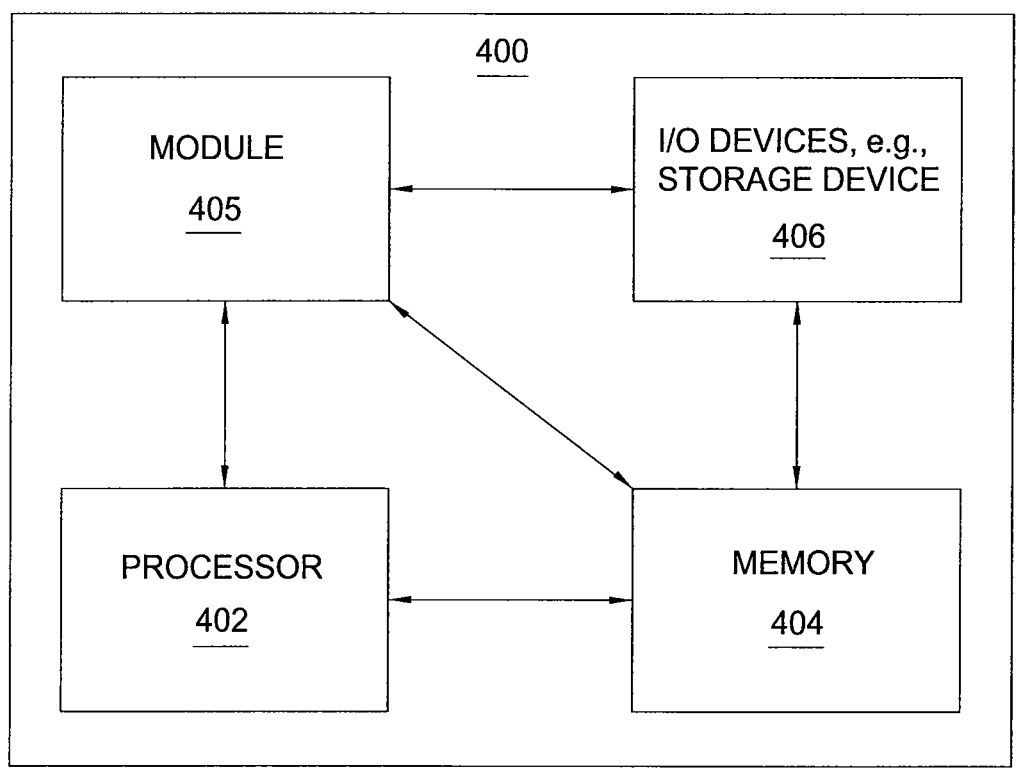
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a call parking feature, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing a call parking feature can be loaded into memory 404 and executed by processor 402 to implement the functions as discussed above. As such, the present method 405 for providing a call parking feature (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling a disconnection of a call, comprising:
    detecting, by a processor of an application server deployed in a communication network of a service provider, the disconnection of a first party from the call between the first party and a second party;
    determining, by the processor, if the disconnection of the first party is due to a hanging up event;
    notifying, by the processor, the second party that the first party has been disconnected unintentionally from the call when the disconnection is not due to the hanging up event;
    providing, by the processor, the second party with a first option to receive call back information and a second option to have the call parked when the disconnection is not due to the hanging up event, wherein the call back information comprises a call back telephone number;
    parking, by the processor, the call for the second party when the second party does not opt to receive the call back information;
    providing, by the processor, the second party with the call back information when the second party opts to receive the call back information; and
    determining, by the processor, if the first party is back online by repeatedly calling back the first party in accordance with a time interval, until the first party is brought back online, when the second party does not opt to receive the call back information.

2. The method of claim 1, further comprising:
    reconnecting the first party and the second party when the first party is back online, when the second party does not opt to receive the call back information.

3. The method of claim 1, further comprising:
    notifying the first party that the first party has a call that is parked, when the second party does not opt to receive the call back information;
    requesting whether the first party wishes to pickup the call that is parked; and
    connecting the first party to the second party when the first party provides an indication to pickup the call that is parked.

4. A non-transitory computer-readable medium storing a plurality of instructions which, when executed by a processor of an application server deployed in a communication network of a service provider, cause the processor to perform operations for handling a disconnection of a call, the operations comprising:
    detecting the disconnection of a first party from the call between the first party and a second party;
    determining if the disconnection of the first party is due to a hanging up event;
    notifying the second party that the first party has been disconnected unintentionally from the call when the disconnection is not due to the hanging up event;
    providing the second party with a first option to receive call back information and a second option to have the call parked when the disconnection is not due to the hanging up event, wherein the call back information comprises a call back telephone number;
    parking the call for the second party when the second party does not opt to receive the call back information;
    providing the second party with the call back information when the second party opts to receive the call back information; and
    determining when the first party is back online by repeatedly calling back the first party in accordance with a time interval, until the first party is brought back online, when the second party does not opt to receive the call back information.

5. The non-transitory computer-readable medium of claim 4, further comprising:
    reconnecting the first party and the second party when the first party is back online, when the second party does not opt to receive the call back information.

6. The non-transitory computer-readable medium of claim 4, further comprising:
    notifying the first party that the first party has a call that is parked, when the second party does not opt to receive the call back information;
    requesting whether the first party wishes to pickup the call that is parked; and
    connecting the first party to the second party when the first party provides an indication to pickup the call that is parked.

7. An apparatus for handling a disconnection of a call, comprising:
    a processor of an application server deployed in a communication network of a service provider; and
    a computer-readable medium storing a plurality of instructions which, when executed by the processor, cause the processor to perform operations, the operations comprising:
        detecting the disconnection of a first party from the call between the first party and a second party;

determining if the disconnection of the first party is due to a hanging up event;

notifying the second party that the first party has been disconnected unintentionally from the call when the disconnection is not due to the hanging up event;

providing the second party with a first option to receive call back information and a second option to have the call parked when the disconnection is not due to the hanging up event, wherein the call back information comprises a call back telephone number;

parking the call for the second party when the second party does not opt to receive the call back information;

providing the second party with the call back information when the second party opts to receive the call back information; and determining when the first party is back online by repeatedly calling back the first party in accordance with a time interval, until the first party is brought back online, when the second party does not opt to receive the call back information.

8. The apparatus of claim 7, further comprising:

reconnecting the first party and the second party when the first party is back online, when the second party does not opt to receive the call back information.

\* \* \* \* \*